3,259,534
METHOD OF ADHESIVE BONDING
Thomas H. Wicker, Jr., and Newton H. Shearer, Jr., Kingsport, Tenn., assignors to Eastman Kodak Company, Rochester, N.Y., a corporation of New Jersey
No Drawing. Filed June 11, 1965, Ser. No. 463,389
14 Claims. (Cl. 156—315)

This is a continuation-in-part application of Serial No. 109,807, filed May 15, 1961.

This invention relates to new α-cyanoacrylate adhesive compositions and bonds formed therefrom. More particularly, our invention is concerned with the incorporation of monomeric epoxide promoters in such compositions to improve the set times of such compositions for bonding metallic or non-metallic surfaces to themselves or to each other and otherwise provide a superior composition.

Adhesive compositions comprising one or more monomeric esters of α-cyanoacrylic acid are disclosed in patents of our co-workers and are well recognized to have excellent utility in bonding together a great variety of materials. Rapid setting to firm bonds is recognized as highly desirable. However, in commercial use, it has been found necessary to stabilize such compositions in order to prevent premature polymerization of the monomer. Such stabilization may be accomplished by incorporating therein phenolic inhibitors such as hydroquinone, t-butyl catechol, etc. For more extensive stabilization, substantial amounts of acidic inhibitors such as sulfur dioxide, nitric oxide, hydrogen fluoride, organic acids or anhydrides, stannic chloride, ferric chloride, and other members of the class of so-called Lewis acids (I. M. Kolthoff, J. Phys. Chem., 48, pages 51–7, 1944) have been added, with or without phenolic inhibitors. Compositions so stabilized are referred to herein as "super" stabilized and are characterized by not setting upon standing on the shelf over relatively long periods of time. One disadvantage, however, is that such stabilized compositions tend to be less active, especially where the materials to be bonded are acid in nature such as green wood, phenolic resins and bonded plywood, for example.

In order to overcome this drawback, various proposals have been made. For example one of our co-workers in his U.S. Patent 2,768,109 describes a means for improving the adhesive action of such "super" stabilized α-cyanoacrylate adhesives whereby the surfaces of the materials to be bonded are moistened with an aliphatic monohydric alcohol prior to application of the adhesive. While certain desired results have been realized from that process, the use of alcohol promoters is not as satisfactory as may be desired where the material to be bonded has been acid treated during its course of preparation, for example, aluminum parts used in aircraft manufacture. Apparently the acid condition encountered with such difficult surfaces and with "super" stabilized adhesive formulations cannot be overcome entirely with small amounts of alcohols.

Further, there has been disclosed by Von Bramer, also one of our co-workers, in his co-pending applications Serial No. 662,345 (filed May 29, 1957) and its continuation-in-part Serial No. 63,459 another improved method. This method is rapid, reproducible and highly effective, and stabilized α-cyanoacrylate adhesive compositions can be effectively employed for bonding metallic and non-metallic materials which heretofore have proven difficult to bond, particularly the firm bonding of materials which have been given an acid treatment during the course of their processing. This latter process includes first treating the surface to be bonded with a catalyst solution comprising amines of certain kinds, followed by the application of the adhesive thereover, and finally pressing the surfaces together. A firm bond is obtained in a relatively short period of time.

It is thought apparent from the foregoing that the development of additional procedures for bonding difficult surfaces and the like represents a highly desirable result.

After extended investigation we have now found that the rapid bonding of such acidic materials and difficult surfaces may be advantageously promoted by applying either a monomeric epoxide or a monomeric diepoxide to one or both of the surfaces which are to be bonded. The α-cyanoacrylate adhesive is applied to the other surface to be bonded, and the bond is formed by bringing the two surfaces together. An improved bond is formed over that which results when presently available prior procedures are utilized. This more desirable bonding may be due to the fact that the epoxides employed are in general soluble in the bonding film and thereby impart a plasticizing action on the bond. At any rate, the bond exhibits increased tensile strength and improved resistance to deterioration by water. An additional advantage which accrues from the use of our system described herein is that larger amounts of acidic stabilizing materials may be used in the adhesive formulation. Thus an adhesive composition of greatly improved shelf-storage life may be formulated. During the bonding operation, the epoxide present on one of the bonding surfaces probably reacts with the acidic component of the adhesive. In addition, sufficient epoxide is present to catalyze the polymerization of the α-cyanoacrylate monomer present in the adhesive.

It is, accordingly, an object of this invention to provide a novel composition and method of utilizing the adhesive action of such new α-cyanocrylate adhesive compositions so that a firm bond occurs in a minimum of time.

Another object is to provide an improved method for treating the surface of materials having an acidic surface character in order to overcome the inhibiting action of the adhesive compositions of this invention without weakening the adhesive bond which is formed.

Another object is to provide a simple and effective means for catalyzing the bonding action of α-cyanoacrylate adhesive compositions which contain stabilizing materials which might slow up any bonding action to an undesired degree.

Another object of this invention is to provide a new and highly effective class of materials for promoting the adhesive action of α-cyanoacrylate esters and to provide a new and improved method for effecting the adhesion of acidic materials without the disadvantages which are inherent in treating such acidic surfaces with basic materials which cause the polymerization of the α-cyanoacrylate esters to proceed with objectionable rapidity.

Another object is to provide a method for using "super" stabilized α-cyanoacrylate adhesive compositions for bonding various materials.

Other objects will become apparent from the description hereinafter set forth.

In the broader practice of our invention, a molecule having one or two epoxide groups may be used. The epoxide function is, of course, a part of an aliphatic chain, but the aliphatic moiety may be a substituent on an aromatic ring system. The epoxide may be applied directly to one of the bonding surfaces or it may be applied as a solution in an inert solvent of low volatility such as acetone, dichloromethane, chloroform, and the like, using any convenient method. For example, it may be sprayed or dipped onto one of the surfaces to be bonded, and after a few seconds to allow the solvent to evaporate, the proper amount of adhesive is applied either to the epoxide treated surface or to the untreated surface and the two surfaces are then pressed together. A rapid and strong bond results within seconds depending to some extent on the concentration of epoxide employed and also on the amount of acidic type material present in the adhesive itself. Thus, by choosing the proper epoxide concentration, the time for bond formation can be regulated as desired. Two advantages result from the wide latitude of bond formation times thus provided. Bonds can be prepared which are either slow setting or rapid setting as may be required based on the time necessary or available to adjust the parts to permit perfect juxtaposition. In addition, adhesive formulations may be prepared which are extremely stable at room temperature or above, but which polymerize rapidly to give strong bonds when exposed to surfaces coated with the catalyst systems described herein. It will be understood that the promoter of the present invention may be applied, if desired, to both surfaces which are to be bonded. Also while some variation in temperature may be safely tolerated, good results are obtainable at about room temperature. In the step of pressing the treated surfaces together with the interlayer of adhesive, heat may be applied if desired.

The monomeric epoxides which can advantageously be used in our invention are preferably selected from those defined by the following general structures:

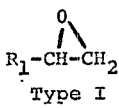
Type I

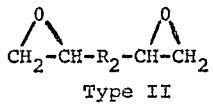
Type II

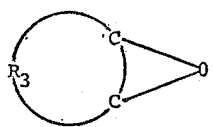
Type III or a suitable combination thereof. In the above structures, $R_1$ represents hydrogen, an alkyl such as normal alkyl, branched alkyl or cyclic alkyl, an alkylidene, an aryl, an alkoxy, an arylalkoxy or substitutes thereof; $R_2$ is an alkylene such as normal alkylene, branched alkylene or cyclic alkylene, an alkylidene, an oxyalkylene, an aryloxyalkylene or substitutes thereof; $R_3$ is an alkylene such as normal alkylene, branched chain alkylene or cyclic alkylene, an alkylidene, a fused ring structure or substitutes thereof. Molecules of Type III may be linked together through alkylene, alkylidene or certain functional groups such as ether or ester to provide molecules containing two epoxide groups. Among epoxides which can function as promoters for cyanoacrylate adhesives are: propylene oxide, epichlorohydrin, limonene monoxide, limonene dioxide, α-pinene oxide, octylene oxide, 1,2-7,8 - diepoxyoctane, dodecene oxide, dicyclopentadiene dioxide, styrene oxide, the bis glycidyl ether of 4,4'-isopropylidene bis phenol, vinylcyclohexene monoxide (1,2-epoxy-4-vinylcyclohexene), vinylcyclohexene diepoxide, 3,4-epoxy-6-methylcyclohexylmethyl-3,4-epoxy-6-methylcyclohexane carboxylate, bis-epoxydicyclopentyl ether of ethylene glycol, and the like.

While practically any volatile solvent in which the epoxide is soluble may be used, the preferred solvents for preparing solutions of the above epoxides are acetone, dichloromethane and chloroform. Other suitable solvents include benzene, hexane, methyl acetate, ethyl acetate, methyl chloroform, methyl ethyl ketone, carbon tetrachloride, ethyl ether, and the like.

In general the solvents used should preferably have a boiling point of less than 100° C. and should not react with the epoxide under the conditions of use. The effective concentration of the epoxide may vary from 1 to 100%, based on the total weight of the solution.

Suitable adhesive compositions for practicing our invention comprise one or more α-cyanoacrylate monomers represented by the general formula:

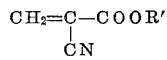

wherein R' represents an alkyl radical of 1 to 16 carbon atoms, for example, methyl, ethyl, butyl, hexyl, dodecyl, etc. radicals, a cyclohexyl radical or a phenyl radical. The lower alkyl α-cyanoacrylate esters are preferred because their bonding is more rapid than is that of the higher esters such as capryl α-cyanoacrylate. Advantageously, the above defined monomers may be thickened by incorporation therein of polymeric materials such as a polyacrylate, a polymethacrylate, a cellulose ester, etc. in an amount up to 25% by weight based on the total composition weight. A plasticizer may also be advantageously added to the composition such as alkyl esters of aliphatic monocarboxylic acids, e.g., methyl cyanoacetate, ethyl cyanoacetate, etc., phthalates such as dioctyl phthalate, phosphates such as tricresyl phosphate, acyl triesters of glycerin such as glyceryl triacetate, glyceryl tributyrate, etc., esters of aliphatic dibasic acids such as dimethyl succinate, diethyl adipate, dimethyl sebacate, diethyl sebacate, etc. and similar plasticizing materials in an amount of from 1 to 20% based on the total weight of the monomer. As already discussed above, the adhesive compositions are protected against premature polymerization of the monomer by addition thereto of a polymerization inhibitor such as hydroquinone, t-butyl catechol, etc. However, usually the monomer contains varying amounts (from about 0.001 to 0.10% by weight) of residual gaseous inhibitors such as sulfur dioxide, nitric oxide, and hydrogen fluoride which were originally introduced to prevent polymerization of the monomer during its manufacture and also to guarantee an adequate shelf life for the final adhesive formulation. A typical adhesive composition for use in the invention has the following weight composition:

| | Percent |
|---|---|
| Methyl α-cyanoacrylate containing 0.01% hydroquinone plus an undetermined amount of sulfur dioxide (0.001 to 0.10%) | 90.7 |
| Polymethyl methacrylate | 6.0 |
| Dimethyl sebacate | 3.3 |

The following examples will illustrate further the manner of practicing our invention. It will be understood, however, that these examples are included to illustrate certain preferred embodiments of our invention.

*Example 1*

This example illustrates the effectiveness of an epoxide of the present invention in promoting the bonding of aluminum surfaces compared with a non-promoted bond using a slow-acting adhesive formulation.

(a) Two pieces of aluminum metal ¼" x 1" x 3" were cleaned by wiping with acetone. On a 1" x 1" area of one of the pieces was placed one drop of a methyl 2-cyanoacrylate adhesive containing 0.002% sulfur dioxide as inhibitor. The other piece of metal was placed over the area containing the adhesive and a strong bond had formed after 2 minutes.

(b) Experiment (a) was repeated with the exception that the second aluminum surface was coated with a drop of the epoxide, butadiene monoxide. The bond was formed by bringing the coated areas into contact and mixing the fluids with a light swirling motion. The bond formed immediately.

The above results appear to clearly illustrate the superiority of the epoxides of this invention in promoting the adhesive bonding of stabilized adhesives on aluminum.

*Example 2*

This example shows the effectiveness of a solution of limonene monoxide in promoting the bonding of glass surfaces as compared with the non-promoted bond using a slow-acting adhesive formulation. The structural formula for this is represented by:

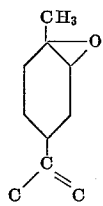

(a) On a piece of polished plate glass, ¼" x 1" x 3" was placed a drop of methyl 2-cyanoacrylate adhesive containing 150 p.p.m. sulfur dioxide. A similar piece of plate glass was placed over the drop. No bond had formed after five minutes.

(b) The experiment was repeated with the exception that the second piece of glass was coated with a 10% acetone solution of limonene monoxide. The acetone was allowed to evaporate and a bond had formed 10 sec. after the two pieces of glass had been brought into contact.

The following further examples demonstrate the effectiveness of a number of other epoxides in promoting the bonding of a variety of materials.

*Example 3*

This example shows the effectiveness of styrene oxide in promoting formation of an adhesive bond. The structural formula for this epoxide is represented by:

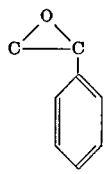

On a piece of stainless steel, ¼" x 1" x 3", was placed one drop of methyl 2-cyanoacrylate adhesive containing 0.002% sulfur dioxide. A similar piece of metal was placed over the drop. A strong bond had formed after two minutes.

The experiment above was repeated with the exception that the second piece of stainless steel was moistened with styrene oxide. After the two pieces of metal had been brought into contact, a strong bond had formed within 30 seconds.

Using the same procedure, bonds were formed between rubber and glass, glass and aluminum, maple wood and aluminum, two pieces of polyester plastic, and felt and leather.

*Example 4*

This example is exemplary of the effectiveness of 3,4-epoxy-6-methylcyclohexylmethyl - 3,4-epoxy-6-methylcyclohexane carboxylate in promoting formation of an adhesive bond. The structural formula of this epoxide is:

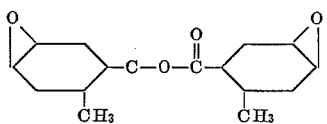

Two pieces of oak wood, ¼" x 1" x 3" were sanded lightly to provide smooth mating surfaces. On one of the surfaces was placed one drop of a butyl 2-cyanoacrylate adhesive. The other piece of wood was placed over the drop. A strong bond had formed after a cure time of three minutes.

The above experiment was repeated with the exception that on the second piece of wood was placed one drop of 3,4-epoxy-6-methylcyclohexylmethyl - 3,4-epoxy-6-methylcyclohexane carboxylate. On the first piece of wood was placed one drop of the butyl 2-cyanoacrylate adhesive. The bond was formed by bringing the coated areas into contact. An unbreakable bond was formed within 30 seconds.

*Example 5*

This example is exemplary of the effectiveness of styrene oxide in the promotion of bond formation.

Two pieces of oak wood, ¼" x 1" x 3", were sanded lightly to provide smooth mating surfaces. To one of the surfaces was applied a 10% chloroform solution of styrene oxide. On the other surface was placed one drop (over a 1-sq. in. area) of a butyl 2-cyanoacrylate adhesive. After the chloroform had evaporated, the bond was formed by bringing the surfaces into contact. An unbreakable bond resulted after thirty seconds cure.

In a similar manner, bonds were prepared between two pieces of maple wood using a 1% chloroform solution of styrene oxide and a methyl 2-cyanoacrylate adhesive.

*Example 6*

This example is exemplary of the effectiveness of octylene oxide as a promoter for fast bond formation with a cyclohexyl 2-cyanoacrylate adhesive.

Two pieces of aluminum metal, ¼" x 1" x 3", were cleaned by wiping with acetone. On a 1" x 1" area of one of the surfaces was placed one drop of octylene oxide. On the other surface was placed one drop of a cyclohexyl 2-cyanoacrylate adhesive. The bond was formed by bringing the coated areas into contact and mixing the fluids with a light swirling motion. The bond formed within one minute.

*Example 7*

This example is exemplary of the effectiveness of an acetone solution of the bis glycidyl ether of 4,4'-isopropylidene bis phenol for promotion of bond formation. The structural formula of this promoter is:

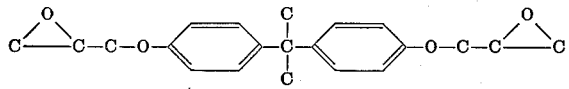

On a piece of aluminum, ¼" x 1" x 3", was placed one drop of a phenyl 2-cyanoacrylate adhesive containing 0.002% sulfur dioxide. A similar piece of aluminum was placed over the drop. A bond had not formed within three minutes.

The above experiment was repeated with the exception that one of the pieces of aluminum was moistened with a 50% acetone solution of the bis glycidyl ether of 4,4'-isopropylidene bis phenol. On the other piece of aluminum was placed one drop of the phenyl 2-cyanoacrylate adhesive. The two pieces of aluminum were brought together and a strong bond resulted.

*Example 8*

This example is exemplary of the effectiveness of vinylcyclohexene diepoxide in the promotion of bond formation. This structural formula is represented by:

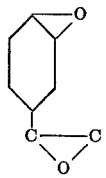

On one aluminum strip a drop of methyl 2-cyanoacrylate adhesive was placed. A similar piece of aluminum was placed over the drop. A bond did not form within 30 seconds. Very weakly set bonds had formed within 45 seconds.

The above experiment was repeated with the exception that one of the pieces of aluminum was moistened with a promoter. In this instance the promoter was a 10% acetone solution of vinylcyclohexene diepoxide. On the other piece of aluminum was placed a drop of methyl 2-cyanoacrylate adhesive. A bond which set within ten seconds was formed by bringing the two surfaces into contact.

*Example 9*

This example demonstrates the effectiveness of 1,2-7,8-diepoxyoctane in promotion of bond formation.

The experiment of Example 8 was repeated with the exception that a 10% acetone solution of 1,2-7,8-diepoxyoctane was used as the promoter. The bond set within five seconds.

*Example 10*

This example demonstrates the effectiveness of alpha-pinene oxide in promotion of bond formation. The structural formula for this promoter is represented by:

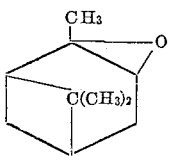

The experiment of Example 8 was repeated with the exception that a solution of alpha-pinene oxide was used as the promoter. A bond formed within 10 seconds.

*Example 11*

This example demonstrates the effectiveness of vinylcyclohexene monoxide as a promoter for bond formation. The structure for this promoter is represented by:

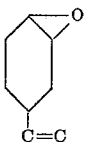

The experiment of Example 8 was repeated with the exception that an acetone solution of vinylcyclohexene monoxide was used as the promoter. A bond formed within 5 seconds.

*Example 12*

This example demonstrates the effectiveness of dicyclopentadiene dioxide as a promoter in bond formation. The structural formula for this promoter is represented by:

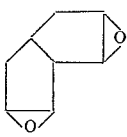

The experiment of Example 8 was repeated with the exception that a 10% acetone solution of dicyclopentadiene dioxide was used as the promoter. On bringing the two mating surfaces together, the bond set within ten seconds.

In a similar manner, the epoxides or epoxide solutions of this invention were used to reduce the bonding times of a variety of adherend combinations.

From the preceding description and examples, it can readily be seen that the procedure of this invention employing a prior treatment with a solution comprising one or more of the aforementioned monomeric epoxides gives a greatly improved bonding with α-cyanoacrylate adhesive compositions. Not only is the time for producing strong bonds shortened, but the results obtained are reproducible. An additional feature realized from the use of our epoxide additives for accelerating the bonding of cyanoacrylate type adhesives is that "super" stabilized formulations may be used. As explained earlier, the incorporation of larger amounts of acidic inhibitors in cyanoacrylate adhesive formulations renders the adhesive less effective. However, the stability of the adhesive toward setting up or standing on the shelf is also greatly increased by using such larger amounts of these acidic inhibitors. Therefore, the epoxide additives of our invention are especially valuable in that they permit the use of these "super" stabilized formulations at infrequent intervals during which the adhesive remains perfectly stable. It will be understood that any other of the mentioned acidic inhibitors such as hydrogen fluoride, nitric oxide, stannic chloride and the so-called Lewis acids, etc., in the range of 0.001 to 2.0% weight of the adhesive composition can also be effectively employed in place of the sulfur dioxide in the above examples.

The factors referred to above are of prime importance in commercial applications, and, as previously mentioned, of outstanding utility where metal parts such as those fabricated of aluminum are to be assembled. While the examples are limited to just a few of the types of monomeric epoxide promoters of our invention, it will be understood that any of the other mentioned suitable monomeric epoxides will function in a generally similar fashion to give firmly bonded materials. The method of the invention can also be employed with advantage in the bonding of other materials such as rubber, plastics, textiles, paper, and the like. Dissimilar materials such as different metal surfaces, etc. can also be bonded by the method of the invention.

Similar advantageous results are obtained with other combinations of adhesives and epoxide promoters over the range of proportions as described. Usually, the single adhesive is used with a single epoxide promoter, although mixtures of two or more monomers may be employed as well as a mixture of two or more promoters.

Although the invention has been described in considerable detail with particular reference to certain preferred embodiments thereof, variations and modifications can be effected within the spirit and scope of the invention as described hereinabove and as defined in the appended claims.

We claim:
1. The method of bonding two surfaces together in a quick and lasting bond which comprises coating one of the surfaces to be bonded with an adhesive composition of a monomeric ester of alpha-cyanoacrylic acid of the formula:

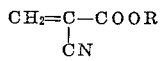

wherein R is selected from the group consisting of alkyl groups of 1–16 carbon atoms, cyclohexyl groups and phenyl groups, said adhesive composition containing polymerization inhibitor, coating the other surface to be bonded with monomeric epoxide, placing together the two surfaces to be bonded, and bonding them together within a few seconds by polymerization of said monomeric ester of alpha-cyanoacrylic acid, said polymerization being promoted by said monomeric epoxide.

2. The method of claim 1 wherein the monomeric ester of alpha-cyanoacrylic acid is methyl 2-cyanoacrylate.

3. The method of claim 1 wherein the monomeric epoxide is butadiene monoxide.

4. The method of claim 1 wherein the monomeric epoxide is limonene monoxide.

5. The method of claim 1 wherein the monomeric epoxide is styrene oxide.

6. The method of claim 1 wherein the monomeric epoxide is octylene oxide.

7. The method of claim 1 wherein the monomeric epoxide is the bis glycidyl ether of 4,4'-isopropylidene bis phenol.

8. The method of claim 1 wherein the monomeric epoxide has one epoxide group.

9. The method of claim 1 wherein the monomeric epoxide is a diepoxide.

10. The method of strongly bonding a material with a quick and lasting bond comprising coating the surface of the material to be bonded with a monomeric epoxide, applying an adhesive composition comprising a monomeric lower alkyl alpha-cyanoacrylate to the epoxide coated surface, said adhesive composition containing a polymerization inhibitor, and bringing the resulting coated surface into contact with the material being bonded thereto, and bonding said materials by polymerization, said polymerization being promoted by said monomeric epoxide.

11. The method of claim 10 wherein at least one of the materials to be bonded is aluminum.

12. The method of claim 10 wherein the monomeric epoxide is monomeric butadiene epoxide.

13. The method of claim 10 wherein the polymerization inhibitor in the adhesive composition is sulfur dioxide.

14. The method of bonding two articles together with a quick and lasting bond comprising coating to one of the surfaces to be bonded an adhesive composition of a monomeric ester of alpha-cyanoacrylic acid of the formula:

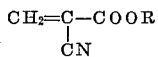

wherein R represents a member selected from the group consisting of alkyl containing 1 to 16 carbon atoms, a cyclohexyl radical and a phenyl radical, said adhesive composition containing a polymerization inhibitor; adding to the surface of the other material to be bonded a monomeric epoxide promoter, said epoxide being a compound selected from the group consisting of compounds defined by the following formula:

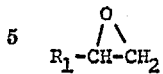 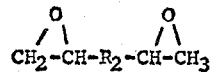

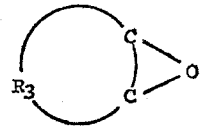

wherein $R_1$ represents an alkyl such as normal alkyl, branched alkyl or cyclic alkyl, an alkylidene, an aryl, an alkoxy, or an arylalkoxy; $R_2$ is an alkylene such as normal alkylene branched alkylene or cyclic alkylene, an alkylidene, an oxyalkylene, or an aryloxyalkylene; $R_3$ is an alkylene such as normal alkylene, branched chain alkylene or cyclic alkylene, an alkylidene or a fused ring structure, placing together the two surfaces to be bonded and bonding the materials together by polymerization of said adhesive composition, said polymerization being promoted by said monomeric epoxide.

No references cited.

EARL M. BERGERT, *Primary Examiner.*

C. B. COSBY, *Assistant Examiner.*